3,378,192
MEANS FOR SECURING THE IMPELLER TO THE MOTOR OF AN ELECTRICALLY DRIVEN FAN
Karl E. Friese, Dover, N.H., assignor to IMC Magnetics Corporation, a corporation of New York
Filed Dec. 20, 1966, Ser. No. 603,319
10 Claims. (Cl. 230—117)

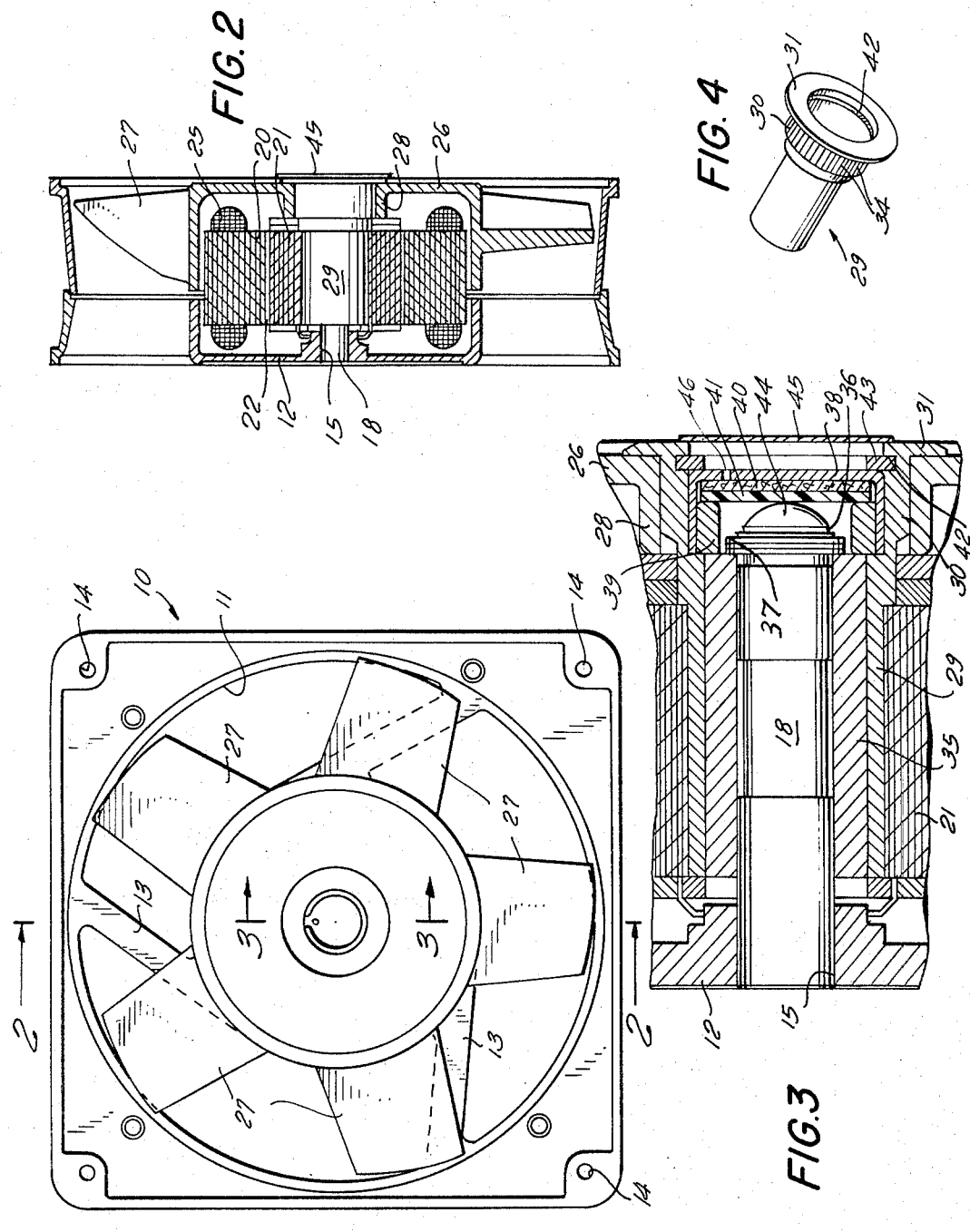

ABSTRACT OF THE DISCLOSURE

A tubular ferrule connects the fan impeller to the rotor of the fan motor. Fixed within the ferrule is a porous bearing rotatable about a shaft fixed to the fan frame. The enlarged head of the ferrule contains a felt ring and disk serving as an oil reservoir for the bearing, and a flange on the end of the head dissipates heat conducted to it from the bearing.

---

This invention relates to electrically driven fans of the type in which the annular rotor of the fan motor is rotatably mounted with respect to a stationary shaft, projecting from the fan framework, by means of a bearing. More particularly, the invention relates to an arrangement for securing the fan impeller to the rotor.

It is an object of the invention to provide a connection between the impeller and rotor which transmits heat from the bearing to the atmosphere and thus maintains the temperature of the bearing as low as possible.

It is another object of the invention to provide such a connection arrangement which carries a supply of lubricant and feeds the lubricant to the bearing as required.

It is a further object of the invention to provide a connection arrangement which permits quick attachment of the impeller to the rotor, and cooperates with means for limiting the axial movement of the rotor with respect to the shaft upon which it is mounted.

To achieve these objects, the invention provides a tubular metal ferrule fixed to the inner surface of the rotor and having a cylindrical bearing fixed to its inner surface. The inner surface of the bearing is in sliding engagement with the outer surface of the fixed shaft. At one end, the diameter of the ferrule is enlarged, and a flange projects outwardly from the free edge of the enlarged end, or head. The impeller is fixed to the outer surface of the ferrule head, and the flange lies against the outer surface of the impeller hub. Thus, the ferrule serves as an integral heat conductive path from the bearing to the flange, which rotates in the atmosphere and dissipates heat conducted to it by the ferrule.

Furthermore, the enlarged interior of the ferrule head accommodates a fibrous lubricant-filled ring. The inner portion of one end of the ring contacts the bearing, and the outer portion of the ring is spaced farther from the axis of rotation of the parts than the bearing. Thus when the bearing contains an adequate supply of oil, oil will build up in the fibrous ring. When the bearing needs oil, however, it will conduct it away from the ring since the bearing and ring are in contact. A further supply of oil is contained in a fibrous disk facing the end of the stationary shaft, and a nylon disk is placed between the fibrous disk and shaft end to serve as a thrust bearing. A cap fits snugly within the ferrule head and encloses the fibrous ring and two disks.

Additional features and advantages of the invention will be brought out in the following description in which reference is made to the accompanying drawings.

In the drawings:

FIG. 1 is a front elevational view of a fan of the type to which this invention relates;

FIG. 2 is a vertical cross-sectional view taken on line 2—2 of FIG. 1;

FIG. 3 is a vertical cross-sectional view, on an enlarged scale, taken on line 3—3 of FIG. 1; and FIG. 4 is a perspective view of a ferrule according to this invention.

The fan chosen to illustrate this invention includes a frame 10 comprising a square outer portion provided with a central circular opening 11, and a motor support 12 held at the center of the opening 11 by a number of struts 13 extending between the support 12 and the outer portion of the frame. If desired, the entire frame can be formed as a single casting. At its corners, the frame 10 is provided with holes 14 for accommodating suitable fasteners (not shown). By means of these fasteners, the frame can be mounted in or near a region in which air is to be circulated.

The motor support 12 is a circular, cup-like element having a central bore 15. One end of a stationary cylindrical shaft 18 is fixed in the bore 15, by any suitable means such as a cement, and the balance of the shaft 18 projects from the support 12 in cantilever fashion. The shaft, in effect, serves as an extension of the frame 10 upon which the impeller of the fan is rotatably supported.

The impeller is rotated by an induction motor comprising a stator 20 and a rotor 21. The stator 20 is a generally annular shaped body having a central bore 22, and is fixed within the motor support 12 by suitable fastening means (not shown). The stator is provided with the usual field windings 25 which may be energized from any suitable source of electrical current. The rotor 21 is an annular body located within the bore 22 of the stator, but unconnected to the stator.

The impeller of the fan comprises a generally cup-shaped hub 26 formed with radially projecting blades 27. At the center of its front wall, the hub presents an inwardly projecting collar 28. Preferably, the hub 26, blades 27, and collar 28 are integrally formed of, for example a suitable molded plastic. When the impeller is in place, as shown in FIG. 2, the side walls of the hub 26 terminate close to the side walls of the motor support 12, whereby the hub and motor support form a housing for the induction motor.

The impeller is secured to the rotor 21 by means of a generally tubular ferrule 29, the body portion of the ferrule being fixed, such as by a suitable cement, to the inner surface of the rotor. The ferrule extends beyond the rotor, and terminates in a head 30 of enlarged diameter. A flange 31 extends radially outwardly from the free end of the head 30. The outer diameter of the head 30 is about equal to the inner diameter of the collar 28, and the head 30 is formed with axially extending ridges 34 which project radially from its outer surface. Thus, when the ferrule head 30 is formed into the collar 28, the ridges 34 grip the inner surface of the collar and secure the ferrule to the impeller. Thereafter, the body of the ferrule is secured to the rotor 21. The flange 31 defines the assembled relationship of the ferrule and impeller, by seating against the outer face of the hub 26.

Fixed to the inner surface of the body of the ferrule 29 is a cylindrical bearing 35 which is rotatable over the surface of the shaft 18. By means of this bearing, the ferrule, and hence the rotor 21 and the impeller are rotatably supported on the shaft 18.

In assembling the fan, the stator is first fixed to the framework. The bearing, ferrule, rotor, impeller assembly is then slipped over the shaft 18, and a snap ring 36 and spacer washers 37 are then pushed over the end 44 of the shaft 18, the ring 36 snapping into an annular groove near the shaft end. The washers 37 abut against the right end face (in FIG. 3) of the bearing 35 and thereby prevent the ferrule 29 and the parts fixed to it from moving toward the right and slipping off the shaft 18. Snugly fitted within the ferrule head 30 is a cap 38 enclosing a fibrous ring 39, a fibrous disk 40, and a nylon disk 41. Adjacent to the outer face of the cap 38, the inner surface of the wall of the ferrule head is formed with an annular groove 43. As a consequence of this construction, when the fan is in operation and blowing air toward the right in FIGS. 2 and 3, the reaction force on the impeller urges the latter toward the left. This force is transmitted through the ferrule and snap ring 43 to the cap 38, which in turn forces the nylon disk 41 against the rounded end 44 of the shaft. Movement of the rotating parts toward the left is thereby limited.

The ferrule 29 is fabricated of a good heat conducting material, such as aluminum. As a result, when heat develops in the bearing 35, due to its rotation with respect to the shaft 18, the heat is readily picked up by the body of the ferrule and transmitted through the head 30 to the flange 31. Since the flange 31 rotates in the atmosphere it quickly dissipates the head conducted to it. The bearing 35 and rotor 21 are thereby kept relatively cool.

The bearing is formed of a very porous material, such as produced by sintering a mixture of graphite and bronze powder. Before assembly with the other parts, the bearing is saturated throughout with a lubricant such as oil. The fibrous ring 39 and disk 40, which may be formed of felt, are also saturated with oil and serve as a reservoir of lubricant for the bearing. The advantages of the arrangement shown in FIG. 3 is as follows: when the fan is started initially, the oil within the porous bearing 35 flows radially outwardly due to centrifugal force. As a result, a pressure builds up at the outer surface of the bearing, and this pressure causes the oil to flow into the felt ring 39, which contacts the end face of the bearing over a portion of the diameter of the ring. The remaining portion of the ring 39 lies radially outwardly of the bearing 35. Consequently, the excess oil will tend to flow toward the outer surface of the felt ring. If the ring is saturated, the oil will flow along the walls of the cap 38 into the felt disk 40. At the same time, the nylon disk 41 becomes covered with oil thus lubricating the interface between the shaft end 44 and the disk 41.

As fan operation proceeds, the oil within the bearing 35 tends to evaporate and break down, and eventually the bearing requires oil. At this point, since the pressure near the outer face of the bearing will have fallen, and the bearing is in contact with the oil drenched felt ring 39, the bearing will such oil out of the ring. As the ring 39 loses oil to the bearing, it will be able to receive oil from the felt disk 40. In order to add oil to the assembly, an oil filled hypodermic syringe may be used. The styrene first pierces the paper nameplate 45, assuming one is used, covering the opening within the head of the ferrule, and then enters the felt disk 40 through a hole 46 provided in the cap 38.

It will be appreciated that the construction described above, involving the use of the ferrule 29, provides several advantages. Firstly, the ferrule connects the impeller to the rotor 21 in a simple manner. Secondly, the snap ring 43 within the ferrule head holds together the thrust bearing comprising the shaft end 44 and nylon disk 41. Thirdly, the ferrule serves to transmit heat from the bearing to the atmosphere. Furthermore, the enlarged head of the ferrule houses the felt ring 39 which provides the oil circulation described above. These latter features serve to greatly prolong the life of the bearing.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An electrically driven fan comprising a frame,
   an induction motor having a stator fixed to said frame and an annular shaped rotor rotatable with respect to said stator and frame,
   a stationary shaft fixed at one end to said frame and projecting in cantilever fashion therefrom,
   a hollow, generally cylindrical ferrule fixed within said rotor and rotatable therewith,
   a cylindrical bearing fixed within the body portion of said ferrule and rotatable with respect to said shaft,
   the free end of said shaft extending beyond said bearing,
   said ferrule having a head portion extending beyond said bearing and shaft,
   a fan impeller fixed to the head of said ferrule,
   means fixed to said shaft near its free end for limiting the axial movement of said bearing in a direction toward the free end of said shaft in order to prevent removal of said bearing, ferrule, stator, and impeller, from said shaft, and
   means fixed within the head of said ferrule and adapted to engage the free end of said shaft for limiting the axial movement of said ferrule in the opposite direction due to the reaction force of moving air on the impeller when the latter rotates.

2. A fan as defined in claim 1 wherein said last-named means includes a cap snugly fitted within said ferrule head, a channel formed in the inner surface of said head adjacent to the side of said cap facing away from said shaft, and a resilient snap ring in said channel serving as an abutment for said cap.

3. A fan as defined in claim 2 including a plastic disk within said cap opposed to the free end of said shaft, said disk and shaft end serving as a thrust bearing between said ferrule and shaft when said impeller is rotating.

4. A fan as defined in claim 1 wherein said ferrule is formed of a heat-conducting material, and including a flange projecting outwardly from the end of said ferrule head opposite to the remainder of said ferrule, said flange being located outwardly of said impeller, whereby heat generated in said bearing is transmitted through said ferrule to said flange from which it is dissipated into the surrounding air.

5. A fan as defined in claim 2 wherein the interior of said ferrule head has a larger diameter than the interior of said ferrule body, said bearing within said ferrule body being formed of a porous material saturated with a liquid lubricant, and including a ring of absorptive material within said cap and coaxial with said bearing, said ring being saturated with lubricant and in constant contact with the end of said bearing.

6. A fan as defined in claim 5 including a disk of absorptive material within said cap parallel to the end wall of said cap opposed to the free end of said shaft, said absorptive disk being saturated with lubricant, and an opening in the end wall of said cap through which additional lubricant may be fed to said absorptive disk.

7. A fan as defined in claim 6 wherein said absorptive ring and disk are formed of felt.

8. A fan as defined in claim 6 including a plastic disk between said absorptive disk and the free end of said shaft.

9. A fan as defined in claim 1 wherein said impeller is provided with a central hole accommodating said ferrule head, and the exterior of said head is formed with means for gripping the inner surface of said hole to nonrotatably join said impeller and ferrule.

10. A fan as defined in claim 9 wherein said gripping means are axially extending ridges projecting radially from said head.

References Cited

UNITED STATES PATENTS

| | | | |
|---|---|---|---|
| 3,276,675 | 10/1966 | Saretzky | 230—117 |
| 3,276,678 | 10/1966 | Saretzky | 230—117 |
| 2,742,223 | 4/1956 | Font | 230—117 |
| 2,926,838 | 3/1960 | Van Rijn | 230—117 |
| 3,158,412 | 11/1964 | Willhoeft et al. | 230—117 |
| 3,229,897 | 1/1966 | Papst | 230—117 |

HENRY F. RADUAZO, *Primary Examiner.*